United States Patent [19]

Vinciguerra et al.

[11] Patent Number: 4,648,626

[45] Date of Patent: Mar. 10, 1987

[54] TELESCOPIC JOINT FOR REPAIRING UNDERWATER PIPELINES LAID AT A GREAT DEPTH

[75] Inventors: Constantino Vinciguerra, Florence; Giampaolo Bonfiglioli, Inzago, both of Italy

[73] Assignees: Nuovo Pignone S.p.A., Florence; Snam S.p.A., Milan, both of Italy

[21] Appl. No.: 760,888

[22] Filed: Jul. 31, 1985

[30] Foreign Application Priority Data

Aug. 7, 1984 [IT] Italy .................... 22248 A/84

[51] Int. Cl.⁴ ............................................ F16L 55/12
[52] U.S. Cl. ................................. 285/15; 29/421 R; 29/507; 29/157.3 R; 29/523; 285/382.4; 285/382.5; 285/97; 285/107; 285/100; 285/298
[58] Field of Search ............... 285/15, 298, 382.4, 285/382.5, 382, 97, 100, 106, 104, 107, 109; 29/421 A, 507, 450, 726, 402.01, 402.09, 402.16, 402.19, 157.3, 523

[56] References Cited

U.S. PATENT DOCUMENTS

| | | | |
|---|---|---|---|
| 2,306,160 | 12/1942 | Freyssinet | 285/97 |
| 2,485,008 | 10/1949 | Morris | 285/97 |
| 2,543,007 | 2/1951 | Fitzgerald et al. | 285/382.4 |
| 3,434,194 | 3/1969 | Whittaker et al. | 29/507 |
| 4,069,573 | 1/1978 | Rogers, Jr. et al. | 29/421 R |
| 4,368,571 | 1/1983 | Cooper, Jr. | 29/157.3 R |
| 4,388,752 | 6/1983 | Vinciguerra et al. | 285/382.5 |
| 4,415,185 | 11/1983 | Vinciguerra et al. | 285/114 |
| 4,420,867 | 12/1983 | Busse | 29/523 |
| 4,547,944 | 10/1985 | Hayden | 29/402.16 |

FOREIGN PATENT DOCUMENTS

| | | | |
|---|---|---|---|
| 89379 | 9/1983 | European Pat. Off. | 29/421 R |
| 2429957 | 2/1980 | France | 285/107 |

*Primary Examiner*—Richard J. Scanlan, Jr.
*Assistant Examiner*—Eric K. Nicholson
*Attorney, Agent, or Firm*—Birch, Stewart, Kolasch & Birch

[57] ABSTRACT

A telescopic joint for repairing underwater pipelines laid at a great depth in which an annular sheath of steel having a yield point of not more than one half that of an outer sleeve of the joint is welded onto an inner cylinder, to create with the inner cylinder an annular chamber or interspace, the cylinder-sheath-sleeve assembly being guided in its telescopic movement by an inner tube welded coaxially to an end of the outer sleeve. The interspace is connected to an oil pump which under adequate pressure can cause the steel sheath to expand, to the extent that it yields, to interlock with the outer sleeve.

5 Claims, 3 Drawing Figures

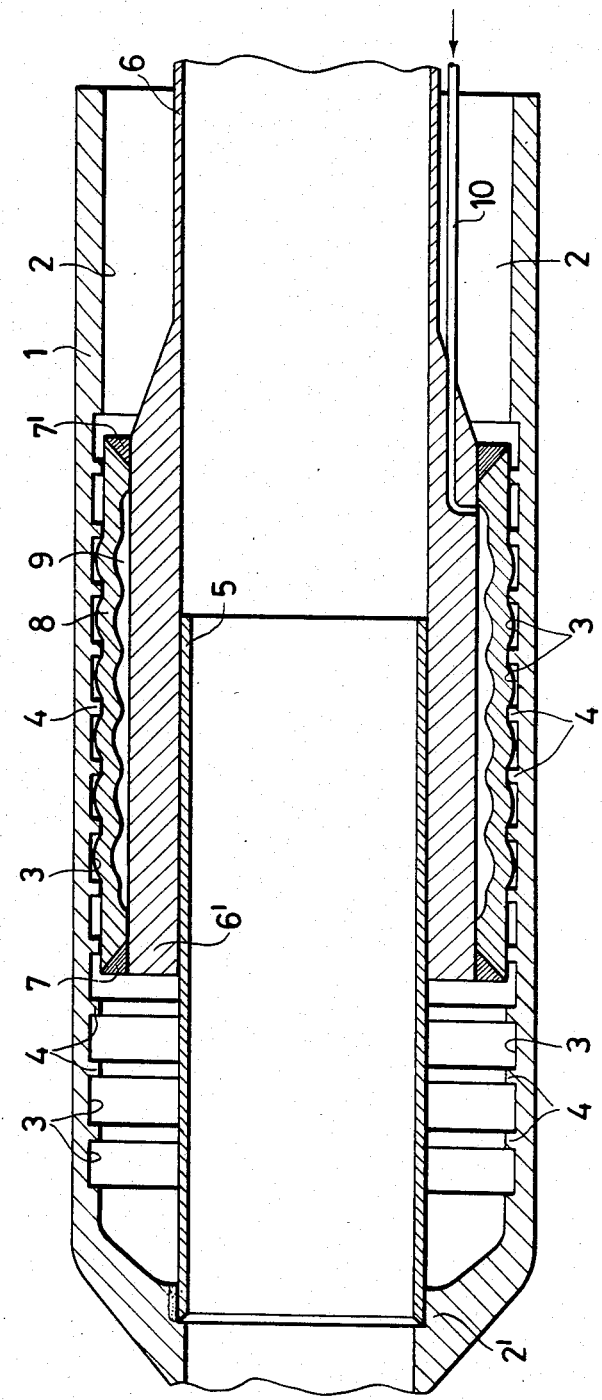

TELESCOPIC JOINT FOR REPAIRING UNDERWATER PIPELINES LAID AT A GREAT DEPTH

BACKGROUND OF THE INVENTION

This invention relates to a telescopic joint which enables its telescopic parts to be rapidly, easily, economically, effectively and adequately locked in position, thereby facilitating the repair of underwater pipelines even if laid at great depth.

The cycle of operations necessary for repairing a damaged underwater pipeline is known to comprise cutting-away the damaged piece of pipeline, joining an outer sleeve in a sealed manner to each of the cut ends of the pipeline, then joining together the made-up ends of the pipeline by means of an intermediate pipe portion prepared on the surface and locked in a sealed manner between the sleeves.

However, in order to be able to compensate for inevitable errors in measuring the distance between the cut ends, this intermediate portion must necessarily contain a telescopic joint which has to be locked in position in a sealed manner when the intermediate portion has been inserted and locked onto the two end sleeves.

Various types of telescopic joint used for repairing underwater pipelines are already known in the state of the art.

These known telescopic joints, which are constituted substantially by two cylindrical parts slidable within each other and capable of being locked hermetically together when correctly positioned in the axial direction, all have in common the fact that they internally comprise complicated sealing and anti-sliding elements which are operated hydraulically.

They therefore all have the double drawback of being complicated and expensive, and of providing an inadequate seal by virtue of its very small length, the seal being limited to those specific points at which the sealing elements are made to act.

SUMMARY OF THE INVENTION

The object of the present invention is to obviate the aforesaid drawbacks by providing an economical telescopic joint which allows its telescopic parts to be rapidly, easily and effectively locked together under sealed conditions, this being essential for the repair of underwater pipelines laid at great depth.

This effective locking-together of the inner part and outer part of the telescopic joint under sealed conditions is attained substantially by using the jointing method described in U.S. Pat. No. 4,388,752 granted on June 21, 1983.

It is possible to produce between two coaxial pipes a residual interference or resistance which generates between them a pressure such as to ensure both an effective seal along the entire zone of contact, and a high resistance to axial thrusts or stresses and thus to mutual sliding or slippage between the two pipes, by simply causing the two pipes to expand radially and then nullifying the expansion force, provided the outer pipe is constructed of a material having a degree of elastic deformation which is greater than that of the inner pipe, and has a thickness which gives it a much higher rigidity than the inner sheath.

For this purpose, there is welded onto the inner slidable cylindrical part of the telescopic joint an annular sheath which creates an annular chamber or interspace with the inner cylinder, the sheath being constructed of a steel having a yield point which is not more than one half that of the sleeve constituting the outer part of the telescopic joint.

In this manner, the two parts of the telescopic joint become coupled together and locked in position by causing the annular sheath to expand radially against the inner wall of the rigid sleeve by feeding oil under pressure into the annular chamber, and then continuing this radial expansion until the outer sleeve reaches its limit of elastic deformation, thus causing considerable permanent deformation of the sheath, which is much less rigid than the outer sleeve. When the oil pressure is reduced, the different elastic return of the materials of the sleeve and sheath thus creates between them a residual interference which ensures a residual contact pressure such as to provide effective resistance to withdrawal and provides a hermetic seal which extends over the entire annular surface of the sheath.

According to a modification of the present invention, the residual contact pressure can be increased by maintaining a certain pressure inside the annular chamber or interspace by means of varied methods, such as by injecting epoxy resins into the chamber.

Again, in order to prevent the inner cylinder onto which the annular sheath is welded from being able to collapse during the operations involved in producing the sealed locking, the inner cylinder is constructed of a steel having a yield point which is as high as possible within the limits of good weldability of the material, and with a thickness which is increased at least in correspondence with the segment of the wall to which the sheath is welded or otherwise referred to as the zone of action of the sheath. Finally, in order to ensure that whatever the relative position of the two telescopic parts of the joint on termination of the pipeline repair there is no excessive increase in the inner diameter of the pipeline, which could prevent the necessary sliding within the pipeline of the so-called known "pigs", i.e. the trolleys equipped for panoramic weld radiography and for checking the mechanical characteristics of the pipeline, the joint sleeve is provided internally with an inner tube, which is coaxially welded to one of its ends and acts as a slide guide for the inner cylinder of the telecopic joint, the inner tube being constructed of the same material and having the same dimensions as the pipeline on which the repair is to be carried out.

Thus, the telescopic joint for repairing an underwater pipeline laid at great depth, the joint being constituted by an inner cylinder telescopically slidable within an outer rigid sleeve constructed of a high-tensile steel, is characterised, according to the present invention, in that an annular sheath of steel having a yield point not more than one half that of the outer sleeve is welded onto the inner cylinder to create with the inner cylinder an annular chamber or interspace which can be expanded radially by means of pressure, the inner cylinder being telescopically guided by an inner tube constructed of the same material and having the same dimensions as the underwater pipeline to be repaired, and being welded coaxially inside and out one end of the outer sleeve.

According to a preferred embodiment of the present invention, instead of being constructed with an inner surface of a constant smooth section, the sleeve is constructed with an inner surface which is profiled in the axial direction by means of a succession of slots and teeth. This additional machining, which however does not involve great difficulty as it can be carried out at surface level with all necessary equipment and comfort, results in a further dual advantage of being more effective in resistance to axial thrust and has lower operating costs. This is because during expansion the considerable permanent deformation causes the sheath to penetrate into the slots so that it remains effectively locked mechanically with a very high resistance to axial thrust which is no longer dependent only on the friction generated by the residual contact pressure, as is the case of a sleeve of constant section having a smooth surface. Moreover, there is no longer the need for careful lathe machining of the sheath in order to completely remove the outer weld seam, the presence of which would prejudice the seal, because the seam now becomes plasticised against the edge of the teeth and it does not detract from a perfect seal. Careful lathe machining, which is long and therefore costly, is thus unnecessary.

The invention is described in detail hereinafter with reference to the accompanying drawings which illustrate a preferred embodiment given by way of non-limiting example in that technical or constructional modifications can be made thereto without departing from the scope of the present invention.

BRIEF DESCRIPTION DRAWINGS

FIG. 3 is a longitudinal section through a joint according to the present invention with the two telescopic parts already hermetically locked together.

Figure 1:
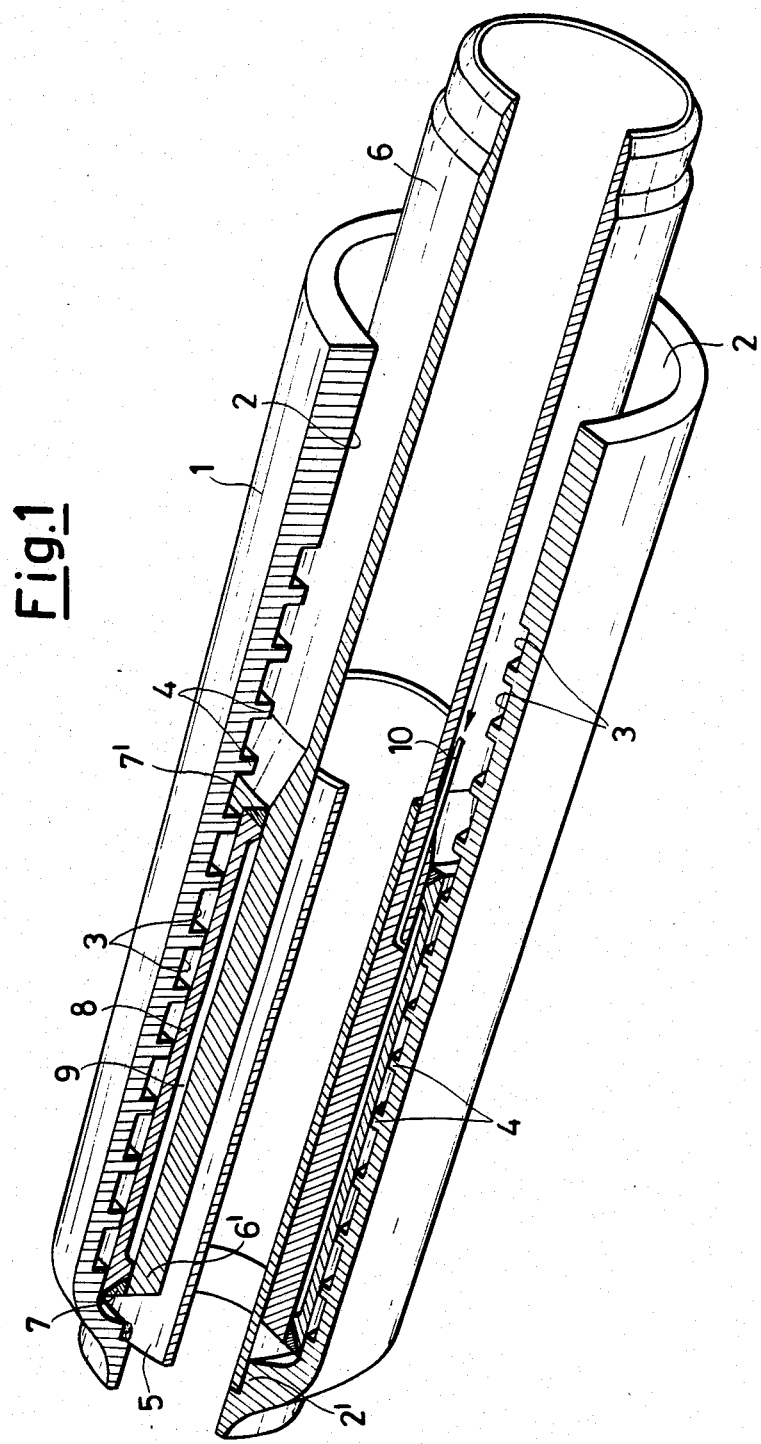
FIG. 1 is a perspective cut-away view of a telescopic joint according to the present invention.
Figure 2:
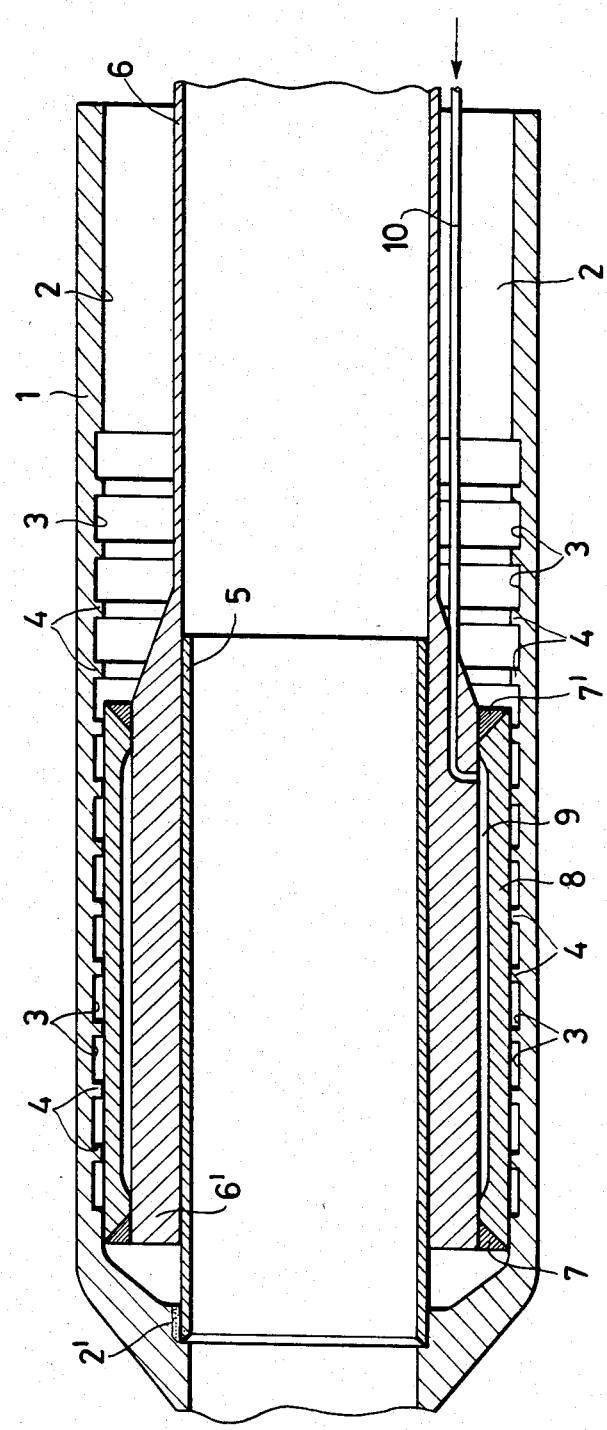
FIG. 2 is a longitudinal section through the joint of FIG. 1.

In the figures, the reference numeral 1 indicates the outer rigid sleeve of the telescopic joint which is constructed of a high-tensile steel of high yield point, and has an inner surface 2 which in the axial direction is profiled with alternating slots 3 and teeth 4.

Inside and to one end 2' of the sleeve 1 there is coaxially welded an inner tube 5 which is constructed of the same material and has the same dimensions as the pipeline which is to be repaired, and acts as an axial slide guide for the inner cylinder 6, which slides telescopically within the sleeve 1.

The inner cylinder 6, on which an annular sheath 8 is fixed by means of two annular welds 7 and 7' to define with the cylinder an annular chamber or interspace 9, is constructed of a steel having a yield point as high as possible within the limits of proper attainability of the welds 7 and 7' and having a thickness 6 which is increased in correspondence to and in cooperation with the sheath 8.

Finally, the annular sheath 8, which, by radial expansion caused by feeding oil under pressure into the annular chamber 9 through a conduit 10 is made to yield and penetrate into and within the slots 3 of the sleeve 1 (see specifically FIG. 3), is constructed of a steel having a yield point which is not more than one half that of the sleeve 1 and has a thickness which is determined algebrically, using known formulas, in such a manner that the pressure generated by the resistance between the sleeve 1 and sheath 8 is close to the maximum pressure that can be withstood without buckling the sheath.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. A telescopic joint for the repair of damaged sections of an underwater pipeline, said joint comprising an inner cylinder which is telescopically slidable within an outer rigid sleeve of high-tensile steel, an annular sheath of steel having a yield point not more than one half that of said outer sleeve welded to a predetermined segment of an outer surface of said inner cylinder in a manner such that said annular sheath forms with said inner cylinder an annular chamber such that said sheath is permanently expanded radially by means of pressure introduced into said chamber to engage an inner surface of said outer rigid sleeve, and an inner tube constructed of the same material as said underwater pipeline to be repaired, said inner tube welded coaxially to one end of said outer sleeve, acting as a slide guide for said inner cylinder.

2. A telescopic joint as in claim 1, further characterised in that said inner cylinder is constructed of a steel having a yield point as high as possible and yet will still maintain a strong weld to said annular sheath, and said inner cylinder a thickness which is greater than that of the deformable sheath so that the pressure causes it to undergo only negligible deformation.

3. A telescopic joint as in claim 1, further including an epoxy resin in said annular chamber which has been solidified after the joint has been installed to further support said permanently deformed sheath.

4. A telescopic joint as in claim 1, wherein said inner surface of said sleeve is profiled in the axial direction as a succession of slots and teeth.

5. A telescopic joint as in claim 1, wherein the wall thickness of said inner cylinder is increased over said predetermined segment of said inner cylinder.

* * * * *